(12) United States Patent
Gao et al.

(10) Patent No.: US 12,537,626 B2
(45) Date of Patent: *Jan. 27, 2026

(54) METHOD, DEVICE AND COMPUTER STORAGE MEDIUM FOR COMMUNICATION USING PHYSICAL DOWNLINK CONTROL CHANNEL CANDIDATES

(71) Applicant: NEC Corporation, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/632,385

(22) Filed: Apr. 11, 2024

(65) Prior Publication Data

US 2024/0259136 A1   Aug. 1, 2024

Related U.S. Application Data

(63) Continuation of application No. 17/797,756, filed as application No. PCT/CN2020/074547 on Feb. 7, 2020, now Pat. No. 11,996,943.

(51) Int. Cl.
*H04L 1/08* (2006.01)
*H04L 1/00* (2006.01)
(Continued)

(52) U.S. Cl.
CPC ............. *H04L 1/08* (2013.01); *H04L 5/0044* (2013.01); *H04L 5/0055* (2013.01);
(Continued)

(58) Field of Classification Search
CPC ....... H04L 1/08; H04L 5/0044; H04L 5/0055; H04W 52/0216; H04W 52/0219; H04W 72/12; H04B 7/0404
See application file for complete search history.

(56) References Cited

U.S. PATENT DOCUMENTS 9,167,535 B2 * 10/2015 Christoffersson ... H04W 52/146
9,215,663 B2 * 12/2015 Hu ...................... H04W 52/146
(Continued)

FOREIGN PATENT DOCUMENTS

CN   108633064 A   10/2018
CN   109151897 A   1/2019
(Continued)

OTHER PUBLICATIONS

International Search Report PCT/CN2020/074547 dated Nov. 11, 2020 [PCT/ISA/210].
(Continued)

*Primary Examiner* — Justin R Knapp
(74) *Attorney, Agent, or Firm* — Sughrue Mion, PLLC (57) ABSTRACT

Embodiments of the present disclosure relate to methods, devices and computer storage media for communication. A method comprises transmitting, from a network device to a terminal device, a set of repetitions of downlink control information (DCI) for scheduling data transmissions from the network device to the terminal device; performing, based on the set of repetitions of the DCI, the data transmissions from the network device to the terminal device; and receiving, from the terminal device, a single feedback signal for the data transmissions. Embodiments of the present disclosure can improve reliability and robustness for Physical Downlink Control Channel (PDCCH).

4 Claims, 8 Drawing Sheets (51) Int. Cl.
*H04L 5/00* (2006.01)
*H04W 52/02* (2009.01)
*H04W 72/12* (2023.01)

(52) U.S. Cl.
CPC ... *H04W 52/0216* (2013.01); *H04W 52/0219* (2013.01); *H04W 72/12* (2013.01)

(56) References Cited

U.S. PATENT DOCUMENTS

| | | | |
|---|---|---|---|
| 9,544,102 B2 | 1/2017 | Nguyen | H04W 72/23 |
| 9,549,377 B1* | 1/2017 | Xu | H04W 52/146 |
| 9,686,783 B1 | 6/2017 | Patel et al. | |
| 11,272,459 B2* | 3/2022 | Huang | H04W 52/367 |
| 2011/0044296 A1 | 2/2011 | Zhang | H04B 7/0404 370/336 |
| 2016/0242196 A1 | 8/2016 | Ji et al. | |
| 2017/0273027 A1 | 9/2017 | Kim et al. | |
| 2018/0115925 A1 | 4/2018 | Moroga et al. | |
| 2019/0182807 A1 | 6/2019 | Panteleev et al. | |
| 2019/0349854 A1 | 11/2019 | Nagaraja et al. | |
| 2020/0008235 A1 | 1/2020 | Sarkis et al. | |
| 2020/0015206 A1 | 1/2020 | Lee | |
| 2020/0029355 A1 | 1/2020 | Liu et al. | |

FOREIGN PATENT DOCUMENTS

| | | | |
|---|---|---|---|
| CN | 109548062 A | | 3/2019 |
| EP | 3 598 818 A1 | | 1/2020 |
| JP | 2015-50575 A | | 3/2015 |
| JP | 2016-98522 A | | 6/2018 |
| WO | 2016/163505 A1 | | 10/2016 |
| WO | 2018/059306 A1 | | 4/2018 |
| WO | 2016/233705 A1 | | 12/2018 |

OTHER PUBLICATIONS

Written Opinion PCT/CN2020/074547 dated Nov. 11, 2020 [PCT/ISA/237].
Extended European Search Report dated Feb. 15, 2023 in European Application No. 20917778.1.
Japanese Office Action dated Jul. 16, 2023 in Japanese Application No. 2022-547936.
JP Office Action for JP Application No. 2022-547936, mailed on Jan. 30, 2024 with English Translation.
CN Office Action for CN Application No. 202080099183.0, mailed on Dec. 3, 2024 with English Translation.
LG Electronics, "Remaining issues on UL data transmission procedure", 3GPP TSG RAN WG1 Meeting AH 1801 R1-1800382, Jan. 13, 2018.

\* cited by examiner

METHOD, DEVICE AND COMPUTER STORAGE MEDIUM FOR COMMUNICATION USING PHYSICAL DOWNLINK CONTROL CHANNEL CANDIDATES

CROSS REFERENCE TO RELATED APPLICATIONS

This application is a continuation application of U.S. patent application Ser. No. 17/797,756 filed on Aug. 5, 2022, which is a National Stage of International Application No. PCT/CN2020/074547, filed Feb. 7, 2020.

TECHNICAL FIELD

Embodiments of the present disclosure generally relate to the field of telecommunication, and in particular, to methods, devices and computer storage media for communication.

BACKGROUND

In the 3GPP meeting RAN #86, enhancements on the support for multi-Transmission and Reception Point (multi-TRP) deployment have been discussed. For example, it has been proposed to identify and specify features to improve reliability and robustness for channels (such as, Physical Downlink Control Channel (PDCCH), Physical Uplink Shared Channel (PUSCH) and Physical Uplink Control Channel (PUCCH)) other than Physical Downlink Shared Channel (PDSCH) using multi-TRP and/or multi-panel with Release 16 reliability features as a baseline. It has also been proposed to identify and specify features to enable inter-cell multi-TRP operations. It has also been proposed to evaluate and specify enhancements for simultaneous multi-TRP transmission with multi-panel reception.

In the 3GPP meeting RAN1 #98-99, It has been proposed to support PDCCH repetitions to improve reliability and robustness for the PDCCH. That is, a PDCCH signal (such as, downlink control information) can be repeatedly transmitted from a network device to a terminal device more than once, so as to improve reliability and robustness for the PDCCH. However, no detail about PDCCH repetitions has been discussed or specified.

SUMMARY

In general, example embodiments of the present disclosure provide methods, devices and computer storage media for communication.

In a first aspect, there is provided a method of communication. The method comprises transmitting, from a network device to a terminal device, a set of repetitions of downlink control information (DCI) for scheduling data transmissions from the network device to the terminal device; performing, based on the set of repetitions of the DCI, the data transmissions from the network device to the terminal device; in response to at least one of the data transmissions being decoded by the terminal device, receiving an acknowledgement from the terminal device; and in response to none of the data transmissions being decoded by the terminal device, receiving a negative acknowledgement from the terminal device.

In a second aspect, there is provided a method of communication. The method comprises receiving, from a network device and at a terminal device, a set of repetitions of DCI for scheduling data transmissions from the network device to the terminal device; decoding, based on the set of repetitions of the DCI, the data transmissions from the network device to the terminal device; in response to at least one of the data transmissions being decoded, transmitting an acknowledgement to the network device; and in response to none of the data transmissions being decoded, transmitting a negative acknowledgement to the network device.

In a third aspect, there is provided a method of communication. The method comprises transmitting, from a network device to a terminal device, a set of repetitions of DCI for scheduling a transmission from the terminal device to the network device, wherein each of the set of repetitions comprises a same transmission power control (TPC) command for power control of the transmission; and decoding the transmission from the terminal device, wherein power of the transmission is controlled based on the TPC command comprised in one of the set of repetitions.

In a fourth aspect, there is provided a method of communication. The method comprises receiving, from a network device and at a terminal device, a set of repetitions of DCI for scheduling a transmission from the terminal device to the network device, wherein each of the set of repetitions comprises a same TPC command for power control of the transmission; in response to a repetition of the set of repetitions being received, extracting the TPC command from the repetition; and performing the transmission from the terminal device to the network device while controlling power of the transmission based on the extracted TPC command.

In a fifth aspect, there is provided a method of communication. The method comprises in response to determining that repetitions of DCI are enabled for scheduling a communication between a network device and a terminal device, incorporating, in each of a set of repetitions of the DCI, information indicating that repetitions of the DCI are enabled for scheduling the communication; transmitting, from the network device to the terminal device, the set of repetitions of the DCI; and performing the communication with the terminal device based on the set of repetitions of the DCI.

In a sixth aspect, there is provided a method of communication. The method comprises detecting, at a terminal device, DCI from a network device for scheduling a communication between the network device and the terminal device; in response to first DCI and second DCI from the network device being detected, determining whether the first DCI and the second DCI belong to a set of repetitions for a same physical control channel; and in response to determining that the first DCI and the second DCI belong to the set of repetitions for the same physical control channel, performing the communication with the network device based on at least one of the set of repetitions.

In a seventh aspect, there is provided a network device. The network device comprises a processor and a memory coupled to the processor. The memory stores instructions that when executed by the processor, cause the network device to perform the method according to the first aspect of the present disclosure.

In an eighth aspect, there is provided a terminal device. The terminal device comprises a processor and a memory coupled to the processor. The memory stores instructions that when executed by the processor, cause the terminal device to perform the method according to the second aspect of the present disclosure.

In a ninth aspect, there is provided a network device. The network device comprises a processor and a memory coupled to the processor. The memory stores instructions that when executed by the processor, cause the network device to perform the method according to the third aspect of the present disclosure.

In a tenth aspect, there is provided a terminal device. The terminal device comprises a processor and a memory coupled to the processor. The memory stores instructions that when executed by the processor, cause the terminal device to perform the method according to the fourth aspect of the present disclosure.

In an eleventh aspect, there is provided a network device. The network device comprises a processor and a memory coupled to the processor. The memory stores instructions that when executed by the processor, cause the network device to perform the method according to the fifth aspect of the present disclosure.

In a twelfth aspect, there is provided a terminal device. The terminal device comprises a processor and a memory coupled to the processor. The memory stores instructions that when executed by the processor, cause the terminal device to perform the method according to the sixth aspect of the present disclosure.

In a thirteenth aspect, there is provided a computer readable medium having instructions stored thereon. The instructions, when executed on at least one processor, cause the at least one processor to perform the method according to the first aspect of the present disclosure.

In a fourteenth aspect, there is provided a computer readable medium having instructions stored thereon. The instructions, when executed on at least one processor, cause the at least one processor to perform the method according to the second aspect of the present disclosure.

In a fifteenth aspect, there is provided a computer readable medium having instructions stored thereon. The instructions, when executed on at least one processor, cause the at least one processor to perform the method according to the third aspect of the present disclosure.

In a sixteenth aspect, there is provided a computer readable medium having instructions stored thereon. The instructions, when executed on at least one processor, cause the at least one processor to perform the method according to the fourth aspect of the present disclosure.

In a seventeenth aspect, there is provided a computer readable medium having instructions stored thereon. The instructions, when executed on at least one processor, cause the at least one processor to perform the method according to the fifth aspect of the present disclosure.

In an eighteenth aspect, there is provided a computer readable medium having instructions stored thereon. The instructions, when executed on at least one processor, cause the at least one processor to perform the method according to the sixth aspect of the present disclosure.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'some embodiments' and 'an embodiment' are to be read as 'at least some embodiments.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

Figure 1:
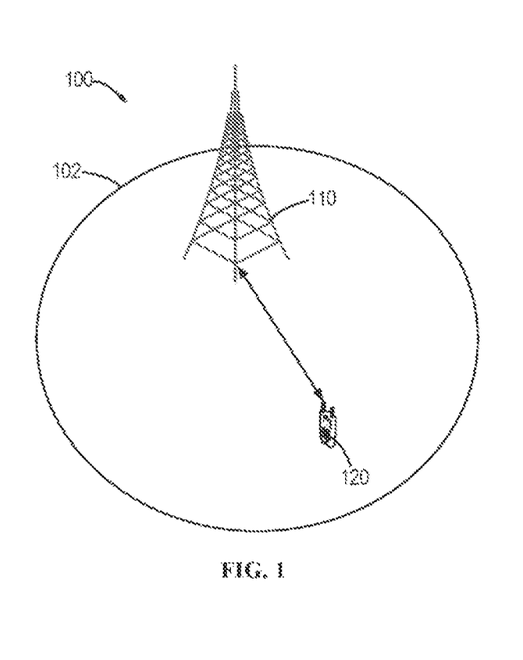
FIG. 1 illustrate an example communication network in which embodiments of the present disclosure can be implemented.

FIG. 1 shows an example communication network 100 in which embodiments of the present disclosure can be implemented. The network 100 includes a network device 110 and a terminal device 120 served by the network device 110. The network 100 may provide one or more serving cells 102 to serve the terminal device 120. It is to be understood that the number of network devices, terminal devices and/or serving cells is only for the purpose of illustration without suggesting any limitations to the present disclosure. The network 100 may include any suitable number of network devices, terminal devices and/or serving cells adapted for implementing implementations of the present disclosure.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. For the purpose of discussion, in the following, some embodiments will be described with reference to UE as an example of the terminal device 120.

As used herein, the term 'network device' or 'base station' (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device 120 may be connected with a first network device and a second network device (not shown in FIG. 1). One of the first network device and the second network device may be in a master node and the other one may be in a secondary node. The first network device and the second network device may use different radio access technologies (RATs). In one embodiment, the first network device may be a first RAT device and the second network device may be a second RAT device. In one embodiment, the first RAT device may be an eNB and the second RAT device is a gNB. Information related to different RATs may be transmitted to the terminal device 120 from at least one of the first network device and the second network device. In one embodiment, first information may be transmitted to the terminal device 120 from the first network device and second information may be transmitted to the terminal device 120 from the second network device directly or via the first network device. In one embodiment, information related to configuration for the terminal device configured by the second network device may be transmitted from the second network device via the first network device. Information related to reconfiguration for the terminal device configured by the second network device may be transmitted to the terminal device from the second network device directly or via the first network device. The information may be transmitted via any of the following: Radio Resource Control (RRC) signaling, Medium Access Control (MAC) control element (CE) or DCI.

In the communication network 100 as shown in FIG. 1, the network device 110 can communicate data and control information to the terminal device 120 and the terminal device 120 can also communication data and control information to the network device 110. A link from the network device 110 to the terminal device 120 is referred to as a downlink (DL), while a link from the terminal device 120 to the network device 110 is referred to as an uplink (UL).

In some embodiments, for downlink transmissions, the network device 110 may transmit control information via a PDCCH and/or transmit data via a PDSCH to the terminal device 120. Additionally, the network device 110 may transmit one or more reference signals (RSs) to the terminal device 120. The RS transmitted from the network device 110 to the terminal device 120 may also referred to as a "DL RS". Examples of the DL RS may include but are not limited to Demodulation Reference Signal (DMRS), Channel State Information-Reference Signal (CSI-RS), Sounding Reference Signal (SRS), Phase Tracking Reference Signal (PTRS), fine time and frequency Tracking Reference Signal (TRS) and so on.

In some embodiments, for uplink transmissions, the terminal device 120 may transmit control information via a PUCCH and/or transmit data via a PUSCH to the network device 110. Additionally, the terminal device 120 may transmit one or more RSs to the network device 110. The RS transmitted from the terminal device 120 to the network device 110 may also referred to as a "UL RS". Examples of the UL RS may include but are not limited to DMRS, CSI-RS, SRS, PTRS, fine time and frequency TRS and so on.

The communications in the network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

As described above, in the 3GPP meeting RAN1 #98-99, It has been proposed to support PDCCH repetitions to improve reliability and robustness for the PDCCH. That is, a PDCCH signal (such as, downlink control information) can be repeatedly transmitted from a network device (such as, the network device 110) to a terminal device (such as, the terminal device 120) more than once, so as to improve reliability and robustness for the PDCCH. However, no detail about PDCCH repetitions has been discussed or specified.

In some scenarios, multiple PDCCH repetitions may schedule multiple PDSCH transmissions from a terminal device (such as, the terminal device 120) to a network device (such as, the network device 110). Traditionally, the terminal device may decode each of the multiple PDSCH transmissions and feedback, to the network device, an acknowledgement (ACK) or a negative acknowledgement (NACK) for each of the multiple PDSCH transmissions. However, if the multiple PDSCH transmissions are related to same data or a same transport block (TB), respective ACK/NACK feedback signals for the multiple PDSCH transmissions may be unnecessary.

Embodiments of the present disclosure provide a solution to solve the above problem and/or one or more of other potential problems. In this solution, in case that multiple PDCCH repetitions are enabled for scheduling one or more PDSCH transmissions related to same data or same TB(s), if at least one of the one or more PDSCH transmissions are decoded by the terminal device successfully, the terminal device may feedback only one ACK to the network device. Only if none of the one or more PDSCH transmissions is decoded by the terminal device successfully, the terminal device may feedback a NACK to the network device.

Figure 2:
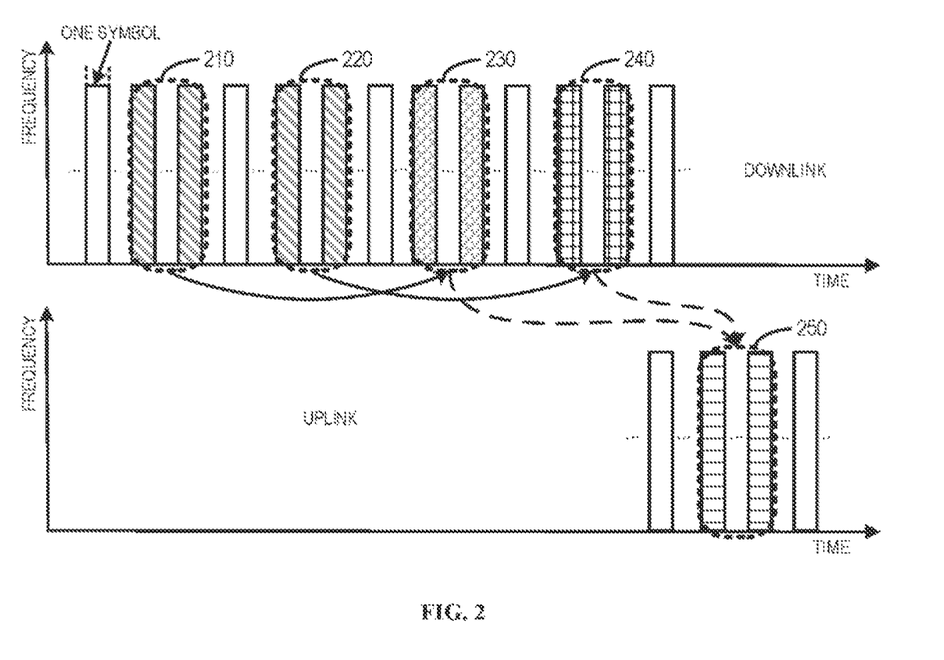
FIG. 2 illustrates an example of PDCCH repetitions in accordance with some embodiments of the present disclosure.

FIG. 2 illustrates an example of such embodiments. As shown in FIG. 2, in response to PDCCH repetitions being enabled, the network device 110 may transmit a set of PDCCH repetitions (that is, repeated DCI) 210 and 220 to the terminal device 120, for scheduling data transmissions 230 and 240 from the network device 110 to the terminal device 120.

In some embodiments, prior to transmitting the set of PDCCH repetitions 210 and 220, the network device 110 may transmit, to the terminal device 120, an indication that PDCCH repetitions are enabled for scheduling the data transmissions 230 and 240. For example, the indication may be transmitted from the network device 110 to the terminal device 120 via any of the following: Radio Resource Control (RRC) signaling, Medium Access Control (MAC) control element (CE) and DCI. Alternatively, in other embodiments, the network device 110 may not transmit such explicit indication to the terminal device 120 in advance. Instead, the network device 110 may indicate to the terminal device 120 via the set of PDCCH repetitions 210 and 220 implicitly that PDCCH repetitions are enabled for scheduling the data transmissions 230 and 240, as will be described in detail below with reference to FIGS. 8-11. That is, in response to receiving the DCI 210 and the DCI 220 from the network device 110, the terminal device 120 may determine whether the DCI 210 and the DCI 220 are repeated DCI. In response to the terminal device 120 determining that the DCI 210 and the DCI 220 are repeated DCI, the terminal device 120 may determine that PDCCH repetitions are enabled for scheduling the data transmissions 230 and 240.

Then, as shown in FIG. 2, the network device 110 may perform the data transmissions 230 and 240 to the terminal device 120 based on the PDCCH repetitions 210 and 220. In some embodiments, the data transmissions 230 and 240 may be related to same data or same TB(s). In this event, the terminal device 120 may decode the data transmissions 230 and 240 from the network device 110, and transmit a single feedback signal to the network device 110 based on the decoding of the data transmissions 230 and 240. In some embodiments, in response to at least one of the data transmissions 230 and 240 being decoded by the terminal device 120 successfully, the terminal device 120 may transmit one ACK 250 to the network device. Otherwise, in response to none of the data transmissions 230 and 240 being decoded by the terminal device 120, the terminal device 120 may transmit a NACK 250 to the network device 110.

Alternatively, in other embodiments, the data transmissions 230 and 240 may be related to different data or different TBs. In this event, the terminal device 120 may decode the data transmissions 230 and 240 from the network device 110 and provide separate ACK/NCK feedback signals for the data transmissions 230 and 240 to the network device 110.

Figure 3:
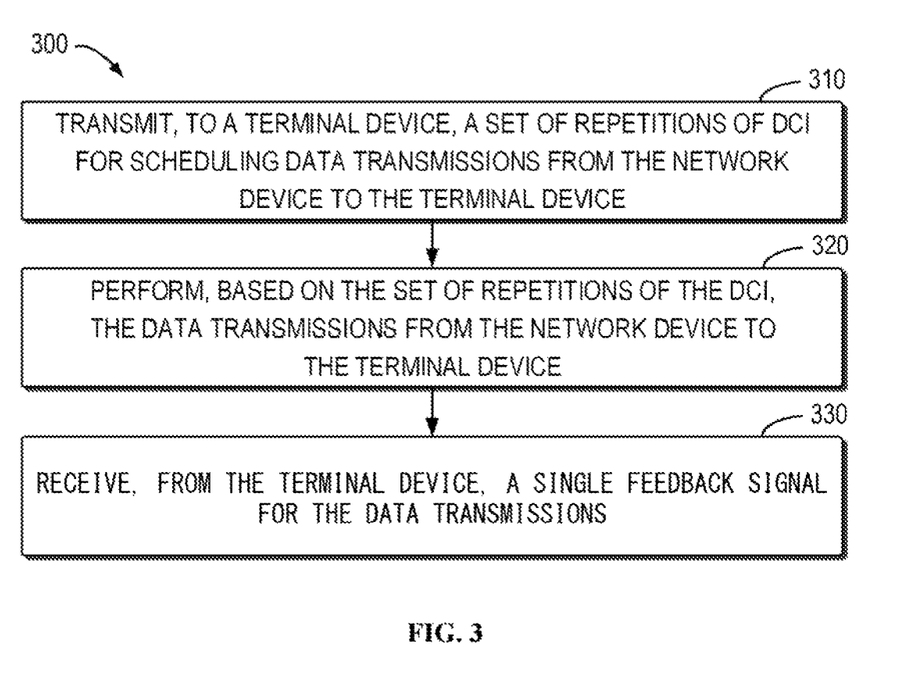
FIG. 3 illustrates a flowchart of an example method in accordance with some embodiments of the present disclosure.

FIG. 3 illustrates a flowchart of an example method 300 in accordance with some embodiments of the present disclosure. The method 300 can be performed at the network device 110 as shown in FIG. 1. It is to be understood that the method 300 may include additional blocks not shown and/or may omit some blocks as shown, and the scope of the present disclosure is not limited in this regard.

At block 310, the network device 110 transmits, to the terminal device 120, a set of repetitions of DCI for scheduling data transmissions from the network device 110 to the terminal device 120.

At block 320, the network device 110 performs, based on the set of repetitions of the DCI, the data transmissions to the terminal device 120.

In some embodiments, the network device 110 may perform the data transmissions by transmitting, to the terminal device 120, a plurality of repetitions of data or a plurality of repetitions of a TB.

At block 330, the network device 110 receives, from the terminal device 120, a single feedback signal for the data transmissions.

In some embodiments, in response to at least one of the data transmissions being decoded by the terminal device 120, the network device 110 receives an ACK from the terminal device 120.

In some embodiments, in response to none of the data transmissions being decoded by the terminal device 120, the network device 110 receives a NACK from the terminal device 120.

In some embodiments, prior to transmitting the set of repetitions of the DCI, the network device 110 may transmit, to the terminal device 120, an indication that repetitions of the DCI are enabled for scheduling the data transmissions.

In some embodiments, the indication may be transmitted via any of the following: RRC signaling; MAC CE; and DCI.

In some embodiments, the network device 110 may transmit, via the set of repetitions, an indication that repetitions of the DCI are enabled for scheduling the data transmissions.

Figure 4:
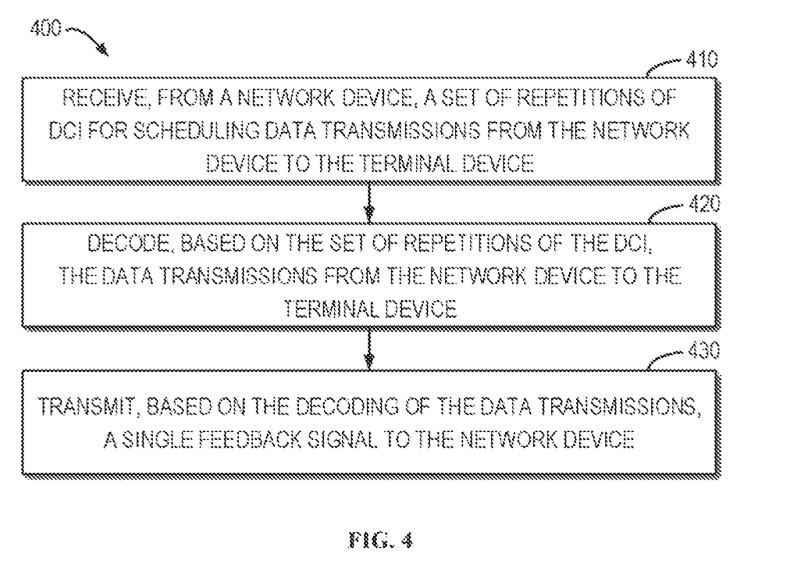
FIG. 4 illustrates a flowchart of an example method in accordance with some embodiments of the present disclosure.

FIG. 4 illustrates a flowchart of an example method 400 in accordance with some embodiments of the present disclosure. The method 400 can be performed at the terminal device 120 as shown in FIG. 1. It is to be understood that the method 400 may include additional blocks not shown and/or may omit some blocks as shown, and the scope of the present disclosure is not limited in this regard.

At block 410, the terminal device 120 receives, from the network device 110, a set of repetitions of DCI for scheduling data transmissions from the network device 110 to the terminal device 120.

At block 420, the terminal device 120 decodes, based on the set of repetitions of the DCI, the data transmissions transmitted from the network device 110 to the terminal device 120.

In some embodiments, the terminal device 120 may decode a plurality of repetitions of data or a plurality of repetitions of a transport block transmitted from the network device 110 to the terminal device 120.

At block 430, the terminal device 120 transmits, based on the decoding of the data transmissions, a single feedback signal to the network device 110.

In some embodiments, in response to at least one of the data transmissions being decoded, the terminal device 120 transmits an ACK to the network device 110.

In some embodiments, in response to none of the data transmissions being decoded, the terminal device 120 transmits a NACK to the network device 110.

In some embodiments, prior to receiving the set of repetitions of the DCI, the terminal device 120 may receive, from the network device 110, an indication that repetitions of the DCI are enabled for scheduling the data transmissions.

In some embodiments, the indication may be received via any of the following: RRC signaling; MAC CE; and DCI.

In some embodiments, the terminal device 120 may receive, via the set of repetitions, an indication that repetitions of the DCI are enabled for scheduling the data transmissions.

In some scenarios, in addition to PDSCH transmission(s), multiple PDCCH repetitions can also schedule a PUSCH transmission, a PUCCH transmission, a SRS transmission or a Channel State Information (CSI) feedback from a terminal device (such as, the terminal device 120) to a network device (such as, the network device 110). Each of the PDCCH repetitions may comprise a transmission power control (TPC) command for power control of the PUSCH transmission, the PUCCH transmission, the SRS transmission or the CSI feedback. Traditionally, within a certain time period, TPC command values comprised in the PDCCH repetitions should be accumulated by the terminal device for power control of the PUSCH transmission, the PUCCH transmission, the SRS transmission or the CSI feedback. However, typically, some of the PDCCH repetitions transmitted from the network device may not be received by the terminal device due to poor channel quality. Therefore, the accumulation of TPC command values comprised in the PDCCH repetitions may not be suitable for power control of the scheduled uplink transmission.

Embodiments of the present disclosure provide a solution to solve the above problem and/or one or more of other potential problems. In this solution, in case that multiple PDCCH repetitions are enabled for scheduling a transmission from the terminal device to the network device, the TPC command comprised in each of the multiple PDCCH repetitions is the same. In response to a PDCCH repetition from the multiple PDCCH repetitions being received by the terminal device, the terminal device may extract the TPC command from the PDCCH repetition and perform the transmission to the network device by controlling power of the transmission based on the extracted TPC command.

In some embodiments, $$\sum_{m=0}^{G(D_i)-1} \delta_{X,b,f,c}(m, l)$$

is a sum of TPC command values in a set $D_i$ of TPC command values with cardinality $G(D_i)$ that the terminal device receives within a time duration, where X is a corresponding transmission scheduled or triggered by PDCCH. For example, the corresponding transmission may be one of PUSCH transmissions, PUCCH transmissions and SRS transmissions. The TPC command values may be received from PDCCH signals for scheduling or triggering different PUSCH transmissions, PUCCH transmissions and/or SRS transmissions. In some embodiments, the time duration is between $K_X(i-i_0)-1$ symbols before PUSCH, PUCCH or SRS transmission occasion $i-i_0$ and $K_X(i)$ symbols before PUSCH, PUCCH or SRS transmission occasion i on an active uplink bandwidth part b of a carrier f of the serving cell c for PUSCH, PUCCH or SRS power control adjustment state l, where $i_0>0$ is the smallest integer for which $K_X(i-i_0)$ symbols before PUSCH, PUCCH or SRS transmission occasion $i-i_0$ is earlier than $K_X(i)$ symbols before PUSCH, PUCCH or SRS transmission occasion i. In some embodiments, there may be Q TPC command values received from Q PDCCH signals (wherein Q is an integer and $1 \le Q \le 64$), and the Q PDCCH signals may be used for scheduling or triggering a same PUSCH transmission, a same PUCCH transmission and/or a same SRS transmission. In this case, only one TPC command value is applied to the above formula $$\sum_{m=0}^{G(D_i)-1} \delta_{X,b,f,c}(m, l).$$

In some embodiments, $$\sum_{m=0}^{G(D_i)-1} \delta_{X,b,f,c}(m)$$

is a sum of TPC command values in a set $D_i$ of TPC command values with cardinality $G(D_i)$ that the terminal device receives within a time duration, where X is a corresponding transmission scheduled or triggered by PDCCH. For example, the corresponding transmission may be one of PUSCH transmissions, PUCCH transmissions and SRS transmissions. The TPC command values may be received from PDCCH signals for scheduling or triggering different PUSCH transmissions, PUCCH transmissions and/or SRS transmissions. In some embodiments, the time duration is between $K_X(i-i_0)-1$ symbols before PUSCH, PUCCH or SRS transmission occasion $i-i_0$ and $K_X(i)$ symbols before PUSCH, PUCCH or SRS transmission occasion i on an active uplink bandwidth part b of a carrier f of the serving cell c for PUSCH, PUCCH or SRS power control adjustment state, where $i_0>0$ is the smallest integer for which $K_X(i-i_0)$ symbols before PUSCH and/or PUCCH and/or SRS transmission occasion $i-i_0$ is earlier than $K_X(i)$ symbols before PUSCH, PUCCH or SRS transmission occasion i. In some embodiments, there may be Q TPC command values received from Q PDCCH signals (wherein Q is an integer and $1 \le Q \le 64$), and the Q PDCCH signals may be used for scheduling or triggering a same PUSCH transmission, a same PUCCH transmission and/or a same SRS transmission. In this case, only one TPC command value is applied to the above formula $$\sum_{m=0}^{G(D_i)-1} \delta_{X,b,f,c}(m).$$

In some embodiments, the network device 110 may configure a number of PDCCH repetitions to the terminal device 120. For example, the number may be L, where L is an integer and $1 \le L \le 64$. For example, L may be at least one of $\{1, 2, 3, 4, 6, 8, 16, 32, 64\}$. In some embodiments, there may be one TPC command value in each PDCCH repetition. For example, the TPC command value in each PDCCH repetition may be represented as δ, where, for example, δ may be any of $\{-3, -2, -1, 0, 1, 2, 3\}$. In some embodiments, the TPC command values in the L PDCCH repetitions may be the same. In some embodiments, the terminal device 120 may receive M PDCCH signals, where M is an integer and $1 \le M \le L$. In some embodiments, the power of the transmission scheduled by the PDCCH repetitions may be adjusted by L*δ. In some embodiments, within the time duration, there may be K PDCCH repetition candidates, where K is an integer and 1≤K≤L. In some embodiments, the power of the transmission scheduled by the PDCCH repetitions may be adjusted by K*δ.

Figure 5:
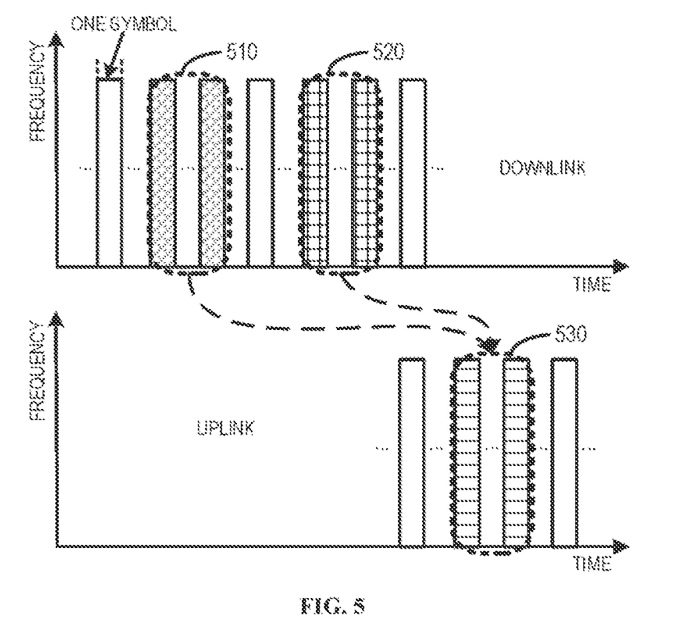
FIG. 5 illustrates an example of PDCCH repetitions in accordance with some embodiments of the present disclosure.

FIG. 5 illustrates an example of such embodiments. As shown in FIG. 5, in response to PDCCH repetitions being enabled, the network device 110 may transmit a set of PDCCH repetitions (that is, repeated DCI) 510 and 520 to the terminal device 120, for scheduling a transmission 530 (such as, PUSCH/PUCCH/SRS/CSI transmission) from the terminal device 120 to the network device 110. Each of the set of PDCCH repetitions 510 and 520 may comprise a same TPC command for power control of the transmission 530.

In some embodiments, prior to transmitting the set of PDCCH repetitions 510 and 520, the network device 110 may transmit, to the terminal device 120, an indication that PDCCH repetitions are enabled for scheduling the transmission 530. For example, the indication may be transmitted from the network device 110 to the terminal device 120 via any of the following: RRC signaling, MAC CE and DCI. Alternatively, in other embodiments, the network device 110 may not transmit such explicit indication to the terminal device 120 in advance. Instead, the network device 110 may indicate to the terminal device 120 via the set of PDCCH repetitions 510 and 520 implicitly that PDCCH repetitions are enabled for scheduling the transmission 530, as will be described in detail below with reference to FIGS. 8-11. That is, in response to receiving the DCI 510 and the DCI 520 from the network device 110, the terminal device 120 may determine whether the DCI 510 and the DCI 520 are repeated DCI. In response to the terminal device 120 determining that the DCI 510 and the DCI 520 are repeated DCI, the terminal device 120 may determine that PDCCH repetitions are enabled for scheduling the transmission 530.

In some embodiments, in response to a PDCCH repetition of the PDCCH repetitions 510 and 520 being received by the terminal device 120, the terminal device may extract the TPC command from the PDCCH repetition. Then, the terminal device 120 may perform the transmission 530 to the network device 110 while controlling power of the transmission 530 based on the extracted TPC command. That is, no accumulation of TPC command values is needed, but only one TPC command value is to be used for power control of the schedule uplink transmission.

Figure 6:
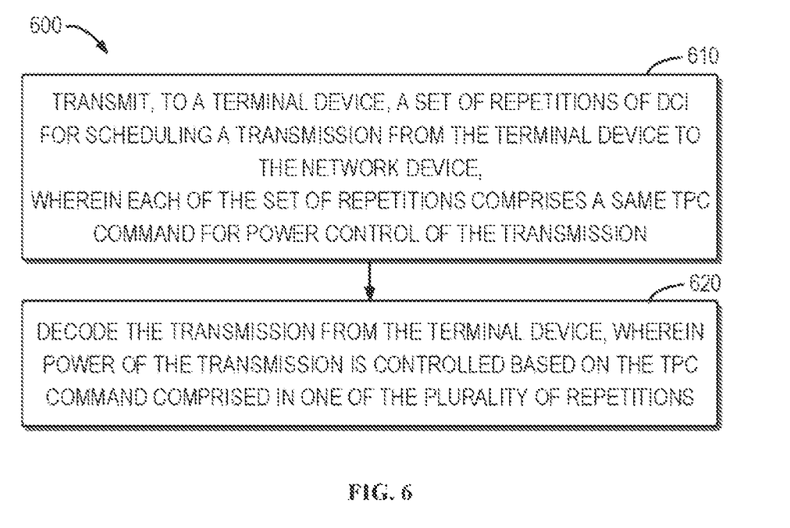
FIG. 6 illustrates a flowchart of an example method in accordance with some embodiments of the present disclosure.

FIG. 6 illustrates a flowchart of an example method 600 in accordance with some embodiments of the present disclosure. The method 600 can be performed at the network device 110 as shown in FIG. 1. It is to be understood that the method 600 may include additional blocks not shown and/or may omit some blocks as shown, and the scope of the present disclosure is not limited in this regard.

At block 610, the network device 110 transmits, to the terminal device 120, a set of repetitions of DCI for scheduling a transmission from the terminal device 120 to the network device 110, where each of the set of repetitions comprises a same TPC command for power control of the transmission.

At block 620, the network device 110 decodes the transmission from the terminal device 120, where power of the transmission is controlled based on the TPC command comprised in one of the set of repetitions.

In some embodiments, the network device 110 may decode the transmission by decoding at least one of the following transmitted from the terminal device 120: data; uplink control information; a SRS; and CSI.

In some embodiments, prior to transmitting the set of repetitions of the DCI, the network device 110 may transmit, to the terminal device 120, an indication that repetitions of the DCI are enabled for scheduling the transmission.

In some embodiments, the indication may be transmitted via any of the following: RRC signaling; MAC CE; and DCI.

In some embodiments, the network device 110 may transmit, via the set of repetitions, an indication that repetitions of the DCI are enabled for scheduling the transmission.

Figure 7:
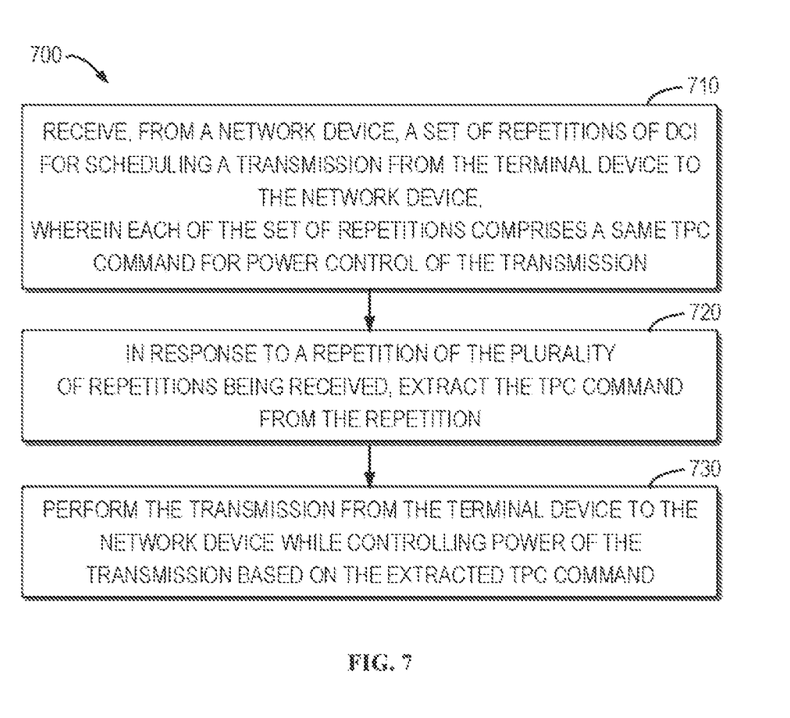
FIG. 7 illustrates a flowchart of an example method in accordance with some embodiments of the present disclosure.

FIG. 7 illustrates a flowchart of an example method 700 in accordance with some embodiments of the present disclosure. The method 700 can be performed at the terminal device 120 as shown in FIG. 1. It is to be understood that the method 700 may include additional blocks not shown and/or may omit some blocks as shown, and the scope of the present disclosure is not limited in this regard.

At block 710, the terminal device 120 receives, from the network device 110, a set of repetitions of DCI for scheduling a transmission from the terminal device 120 to the network device 110, where each of the set of repetitions comprises a same TPC command for power control of the transmission.

In response to a repetition of the set of repetitions being received, at block 720, the terminal device 120 extracts the TPC command from the repetition.

At block 730, the terminal device 120 performs the transmission to the network device 110 while controlling power of the transmission based on the extracted TPC command.

In some embodiments, the terminal device 120 may perform the transmission by transmitting, to the network device 110, at least one of the following: data; uplink control information; a SRS; and CSI.

In some embodiments, prior to receiving the set of repetitions of the DCI, the terminal device 120 may receive, from the network device 110, an indication that repetitions of the DCI are enabled for scheduling the transmission.

In some embodiments, the indication may be received via any of the following: RRC signaling; MAC CE; and DCI.

In some embodiments, the terminal device 120 may receive, via the set of repetitions, an indication that repetitions of the DCI are enabled for scheduling the transmission.

In current 3GPP specifications, there is no detail on how a network device (such as, the network device 110) indicates to a terminal device (such as, the terminal device 120) whether PDCCH repetitions are enabled or not for scheduling a communication between the network device and the terminal device. If the network device only can transmit such indication (that is, whether PDCCH repetitions are enabled or not) to the terminal device via higher layer signaling, it may be not flexible.

Embodiments of the present disclosure provide a solution to solve the above problem and/or one or more of other potential problems. In this solution, an indication on whether PDCCH repetitions are enabled or not can be implicitly configured to the terminal device via the PDCCH repetitions.

Figure 8:
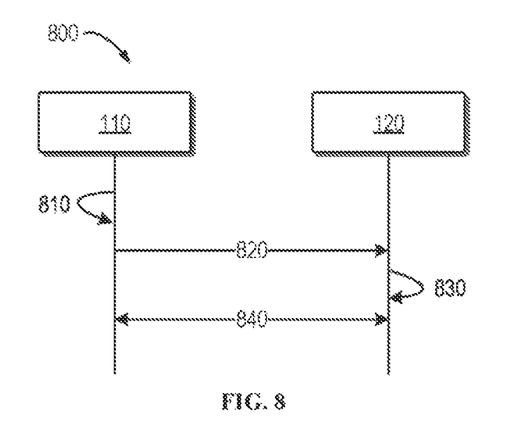
FIG. 8 illustrates an example process for communication in accordance with some embodiments of the present disclosure.

FIG. 8 illustrates an example process 800 for communication in accordance with some embodiments of the present disclosure. The process 800 may involve the network device 110 and the terminal device 120 as shown in FIG. 1. It is to be understood that the process 800 may include additional acts not shown and/or may omit some acts as shown, and the scope of the present disclosure is not limited in this regard.

As shown in FIG. 8, in response to determining that PDCCH repetitions are enabled for scheduling a communication between the network device 110 and the terminal device 120, the network device 110 may incorporate 810, in each of a set of PDCCH repetitions, information indicating that PDCCH repetitions are enabled for scheduling the communication. In some embodiments, the incorporated information may also indicate at least one of the following: an index of the set of repetitions and time offset information about the communication. In some embodiments, the information may be incorporated in at least one bit of each PDCCH repetition (that is, some unused fields in DCI). Alternatively, the information may be indicated by a Cyclic Redundancy Check (CRC) mask applied to CRC bits of each PDCCH repetition. The network device 110 may transmit 820 the set of PDCCH repetitions to the terminal device 120.

The terminal device 120 may detect DCI transmitted 820 from the network device 110. In response to first DCI and second DCI being detected by the terminal device 120, the terminal device 120 may determine 830 whether the first DCI and the second DCI belong to a same set of PDCCH repetitions. In some embodiments, the terminal device 120 may determine, based on at least one bit of the first DCI and the at least one bit of the second DCI, whether the first DCI and the second DCI are repeated DCI. In response to determining that the first DCI and the second DCI are repeated DCI, the terminal device 120 may determine that the first DCI and the second DCI belong to the same set of PDCCH repetitions. Alternatively, or in addition, in some embodiments, the terminal device 120 may determine, based on a first CRC mask applied to CRC bits of the first DCI and a second CRC mask applied to CRC bits of the second DCI, whether the first DCI and the second DCI are repeated DCI. In response to determining that the first DCI and the second DCI are repeated DCI, the terminal device 120 may determine that the first DCI and the second DCI belong to the same set of PDCCH repetitions. Then, the communication between the network device 110 and the terminal device 120 may be performed 840 based on at least one of the set of PDCCH repetitions.

In some scenarios, PDCCH repetitions may be enabled for scheduling a transmission (such as, PDSCH/PUSCH/PUCCH/SRS/CSI transmission) due to poor channel quality. In this event, repetitions of the scheduled transmission may also be needed. For example, if the PDCCH repetitions are enabled for scheduling PDSCH repetitions (that is, PDSCH transmissions related to same data or same TBs), the maximum number of transmission layers may be limited, for example, to 2. In this event, the parameter maxNrofCodeWordsScheduledByDCI may be configured as 2 and the second set of fields (a 5-bit filed indicating Modulation and Code Scheme, a 1-bit filed indicating New Data Indicator and a 2-bit field indicating Redundancy Version) for transport block 2 in DCI can be reused for indicating the above information.

In some embodiments, N bits in each PDCCH repetition (that is, DCI) can be reused and/or additional N bits can be added to each PDCCH repetition to indicate one or more of the following: whether a set of PDCCH repetitions are enabled or not; an index of the set of repetitions; and/or time offset information about the communication scheduled by the PDCCH repetitions. For example, N is an integer and 1≤N≤8. Specifically, only one bit of the N bits may be used to indicate whether PDCCH repetitions are enabled or not. For example, in some embodiments, if the bit is '0', it may indicate that PDCCH repetitions are disabled; and if the bit is '1', it may indicate that PDCCH repetitions are enabled. Alternatively, in other embodiments, if the bit is '1', it may indicate that PDCCH repetitions are disabled; and if the bit is '0', it may indicate that PDCCH repetitions are enabled.

In some embodiments, if the N bits in each PDCCH repetition (that is, DCI) are used to dynamically indicate the time offset information (such as, slot/symbol offset) about the scheduled communication (such as, PDSCH/SRS transmission), other offset indications related to the scheduled communication can be omitted. For example, if the PDCCH repetitions are used to schedule the PDSCH transmission(s), the slot/symbol offset indicated via the time resource allocation for the PDSCH transmission(s) can be omitted. For another example, if the PDCCH repetitions are used to schedule the SRS transmission, the slot offset indicated in the SRS request can be omitted. In some embodiments, the offset value indicated by the N bits in each PDCCH repetition may be a non-negative integer. For example, it may be any of {0, 1, 2, 3, 4, 5, 6, 7, 8 . . . 64}. Alternatively, in some embodiments, the offset value indicated by the N bits in each PDCCH repetition may be a integer. For example, it may be any of {−8, −7, −6, −5, −4, −3, −2, −1, 0, 1, 2, 3, 4, 5, 6, 7, 8 . . . 64}.

Alternatively, in some embodiments, CRC bits of DCI may be scrambled with a CRC mask. The CRC mask applied to CRC bits of the DCI can be used to indicate whether PDCCH repetitions are enabled or not. For example, in some embodiments, if the terminal device 120 receives the first DCI and the second DCI and determines that their CRC bits are scrambled with a same CRC mask indicating that PDCCH repetitions are enabled, the terminal device 120 may determine that the first DCI and the second DCI belong to a same set of PDCCH repetitions. Then the terminal device 120 may decode only one of the first DCI and the second DCI and apply only one set of decoded configurations (such as, time/frequency resource allocation, TPC command and the like). Alternatively, or in addition, in some embodiments, if the terminal device 120 receives the first DCI and the second DCI and determines that their CRC bits are scrambled with a same CRC mask indicating that PDCCH repetitions are enabled, the terminal device 120 may determine that the first DCI and the second DCI belong to a same set of PDCCH repetitions. Then the terminal device 120 may decode only one of the first DCI and the second DCI, and extract the incorporated information from the second set of fields (the 5-bit filed indicating Modulation and Code Scheme, the 1-bit filed indicating New Data Indicator and the 2-bit field indicating Redundancy Version) for transport block 2 in the decoded DCI. For example, the terminal device 120 may determine, from the extracted information, at least one of the following: index of the set of repetitions and/or time offset information about the communication scheduled by the PDCCH repetitions. In some embodiments, if the terminal device 120 receives and/or successfully decodes the first DCI with the CRC bits scrambled with a CRC mask, and if the terminal device 120 then receives the second DCI and detects that the CRC bits of the second DCI is scrambled with the same CRC mask, the terminal device 120 may ignore the second DCI.

Alternatively, or in addition, in some embodiments, a specific Radio Network Temporary Identity (RNTI) can be applied to PDCCH repetitions. In some embodiments, if the terminal device 120 receives and/or successfully decodes the first DCI scrambled with an RNTI value, and if the terminal device 120 then receives the second DCI and detects that the second DCI is scrambled with the same RNTI value, the terminal device 120 may ignore the second DCI.

In some embodiments, CRC attachment can be specified as below. After attachment, the CRC parity bits are scrambled with the corresponding RNTI $x_{rnti,0}, x_{rnti,1}, \ldots, x_{rnti,15}$, where $x_{rnti,0}$ corresponds to the MSB of the RNTI, to form the sequence of bits $c_0, c_1, c_2, c_3, \ldots, c_{K-1}$. The relation between $c_k$ and $b_k$ is: $c_k=b_k$ for k=0, 1, 2, ..., A+7; and $c_k=(b_k+x_{rnti,k-A-8})$ mod 2 for k=A+8, A+9, A+10, ..., A+23.

In some embodiments, the above specification regarding the CRC attachment can be updated as below. After attachment, the CRC parity bits are scrambled with the corresponding RNTI $x_{rnti,0}, x_{rnti,1}, \ldots, x_{rnti,15}$ and PDCCH repetition mask $x_{re,0}, x_{re,1}, \ldots, x_{re,15}$, where $x_{rnti,0}$ corresponds to the MSB of the RNTI, to form the sequence of bits $c_0, c_1, c_2, c_3, \ldots, c_{K-1}$. The relation between $c_k$ and $b_k$ is: $c_k=b_k$ for k=0, 1, 2, ..., A+7; and $c_k=(b_k+x_{rnti,k-A-8}+x_{re,k-A-8})$ mod 2 for k=A+8, A+9, A+10, ..., A+23.

Figure 9:
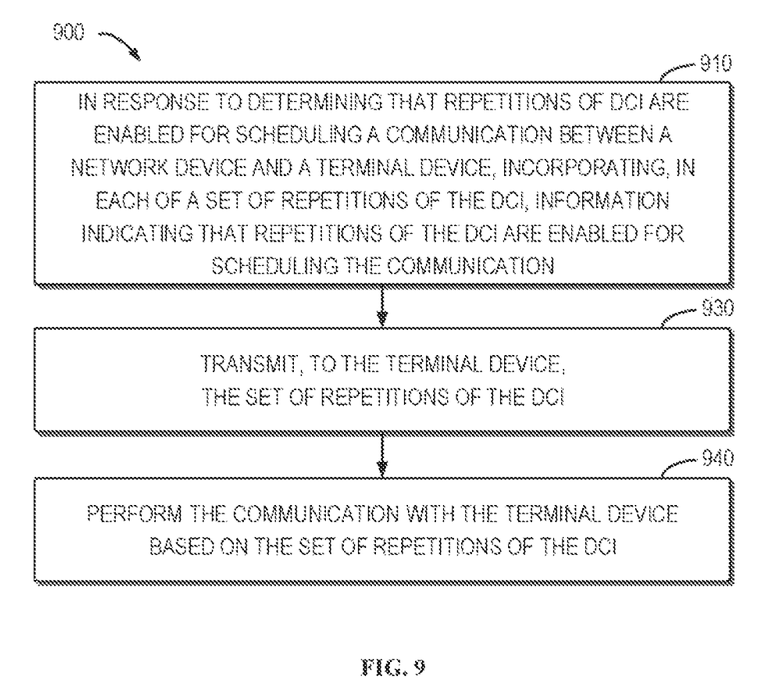
FIG. 9 illustrates a flowchart of an example method in accordance with some embodiments of the present disclosure.

FIG. 9 illustrates a flowchart of an example method 900 in accordance with some embodiments of the present disclosure. The method 900 can be performed at the network device 110 as shown in FIG. 1. It is to be understood that the method 900 may include additional blocks not shown and/or may omit some blocks as shown, and the scope of the present disclosure is not limited in this regard.

At block 910, in response to determining that repetitions of DCI are enabled for scheduling a communication between the network device 110 and the terminal device 120, the network device 110 incorporates, in each of a set of repetitions of the DCI, information indicating that repetitions of the DCI are enabled for scheduling the communication.

In some embodiments, the information may further indicate at least one of the following: an index of the set of repetitions and time offset information about the communication.

In some embodiments, the network device 110 may incorporate the information in at least one bit of each of the set of repetitions.

In some embodiments, the network device 110 may indicate the information by a Cyclic Redundancy Check (CRC) mask applied to CRC bits of each of the set of repetitions.

At block 920, the network device 110 transmits, to the terminal device 120, the set of repetitions of the DCI.

At block 930, the network device 110 performs the communication with the terminal device 120 based on the set of repetitions of the DCI.

Figure 10:
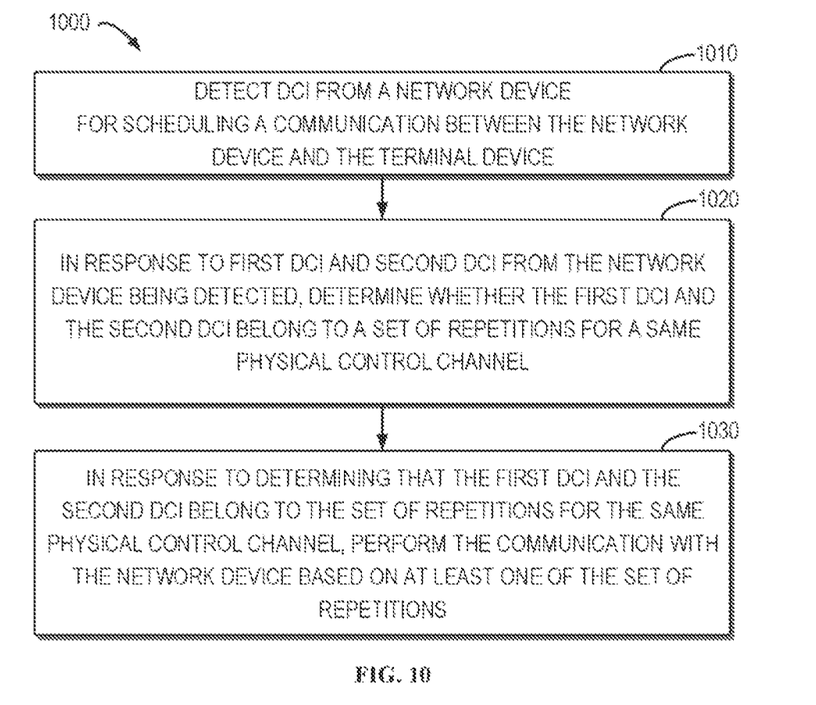
FIG. 10 illustrates a flowchart of an example method in accordance with some embodiments of the present disclosure.

FIG. 10 illustrates a flowchart of an example method 1000 in accordance with some embodiments of the present disclosure. The method 1000 can be performed at the terminal device 120 as shown in FIG. 1. It is to be understood that the method 1000 may include additional blocks not shown and/or may omit some blocks as shown, and the scope of the present disclosure is not limited in this regard.

At block 1010, the terminal device 120 detects DCI from the network device 110 for scheduling a communication between the network device 110 and the terminal device 120.

In response to first DCI and second DCI from the network device being detected, at block 1020, the terminal device 120 determines whether the first DCI and the second DCI belong to a set of repetitions for a same physical control channel.

In some embodiments, determining whether the first DCI and the second DCI belong to the set of repetitions for the same physical control channel comprises: determining, based on at least one bit of the first DCI and the at least one bit of the second DCI, whether the first DCI and the second DCI are repeated DCI; and in response to determining that the first DCI and the second DCI are repeated DCI, determining that the first DCI and the second DCI belong to the set of repetitions for the same physical control channel.

In some embodiments, determining whether the first DCI and the second DCI belong to the set of repetitions for the same physical control channel comprises: determining, based on a first CRC mask applied to CRC bits of the first DCI and a second CRC mask applied to CRC bits of the second DCI, whether the first DCI and the second DCI are repeated DCI; and in response to determining that the first DCI and the second DCI are repeated DCI, determining that the first DCI and the second DCI belong to the set of repetitions for the same physical control channel.

In some embodiments, the terminal device 120 may further determine, from the first or second DCI, at least one of the following: an index of the set of repetitions and time offset information about the communication.

In response to determining that the first DCI and the second DCI belong to the set of repetitions for the same physical control channel, at block 1030, the terminal device 120 performs the communication with the network device 110 based on at least one of the set of repetitions.

Figure 11:
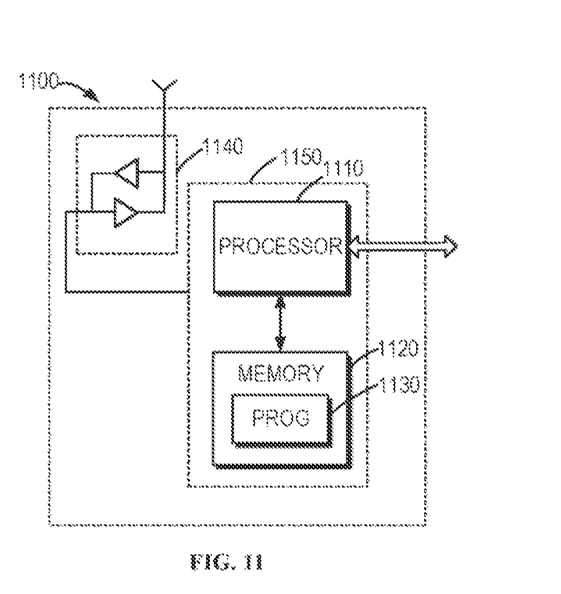
FIG. 11 is a simplified block diagram of a device that is suitable for implementing embodiments of the present disclosure.

FIG. 11 is a simplified block diagram of a device 1100 that is suitable for implementing embodiments of the present disclosure. The device 1100 can be considered as a further example implementation of the network device 110 or the terminal device 120 as shown in FIG. 1. Accordingly, the device 1100 can be implemented at or as at least a part of the network device 110 or the terminal device 120.

As shown, the device 1100 includes a processor 1110, a memory 1120 coupled to the processor 1110, a suitable transmitter (TX) and receiver (RX) 1140 coupled to the processor 1110, and a communication interface coupled to the TX/RX 1140. The memory 1110 stores at least a part of a program 1130. The TX/RX 1140 is for bidirectional communications. The TX/RX 1140 has at least one antenna to facilitate communication, though in practice an Access Node mentioned in this application may have several ones. The communication interface may represent any interface that is necessary for communication with other network elements, such as X2 interface for bidirectional communications between eNBs, SI interface for communication between a Mobility Management Entity (MME)/Serving Gateway (S-GW) and the eNB, Un interface for communication between the eNB and a relay node (RN), or Uu interface for communication between the eNB and a terminal device.

The program 1130 is assumed to include program instructions that, when executed by the associated processor 1110, enable the device 1100 to operate in accordance with the embodiments of the present disclosure, as discussed herein with reference to FIGS. 1 to 10. The embodiments herein may be implemented by computer software executable by the processor 1110 of the device 1100, or by hardware, or by a combination of software and hardware. The processor 1110 may be configured to implement various embodiments of the present disclosure. Furthermore, a combination of the processor 1110 and memory 1120 may form processing means 1150 adapted to implement various embodiments of the present disclosure.

The memory 1120 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1120 is shown in the device 1100, there may be several physically distinct memory modules in the device 1100. The processor 1110 may be of any type suitable to the local technical network, and may include one or more of general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 3, FIG. 4, FIG. 6, FIG. 7, FIG. 9 and/or FIG. 10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of communication, the method comprising:
   transmitting, from a network device to a terminal device, a plurality of Physical Downlink Control Channel (PDCCH) candidates, the plurality of PDCCH candidates corresponding to downlink control information (DCI) for scheduling a transmission from the terminal device to the network device, wherein each of the plurality of PDCCH candidates comprises a same transmission power control (TPC) command for power control of the transmission;
   decoding the transmission from the terminal device, wherein power of the transmission is controlled based on the same TPC command comprised in one of the plurality of PDCCH candidates; and
   prior to the transmitting the plurality of PDCCH candidates, transmitting Radio Resource Control (RRC) signaling including information related to PDCCH repetition.

2. A method of communication, the method comprising:
   receiving, at a terminal device and from a network device, a plurality of PDCCH candidates, the plurality of Physical Downlink Control Channel (PDCCH) candidates corresponding to downlink control information (DCI) for scheduling a transmission from the terminal device to the network device, wherein each of the plurality of PDCCH candidates comprises a same transmission power control (TPC) command for power control of the transmission;
   detecting, from the plurality of PDCCH candidates, the DCI with the same TPC command;
   controlling, based on the TPC command, power of the transmission from the terminal device to the network device; and
   prior to the receiving the plurality of PDCCH candidates, receiving Radio Resource Control (RRC) signaling including information related to PDCCH repetition.

3. A network device, comprising:

at least one memory having program instructions stored therein; and at least one processor configured:

to transmit, to a terminal device, a plurality of Physical Downlink Control Channel (PDCCH) candidates, the plurality of PDCCH candidates corresponding to downlink control information (DCI) for scheduling a transmission from the terminal device to the network device, wherein each of the plurality of PDCCH candidates comprises a same transmission power control (TPC) command for power control of the transmission;

to decode the transmission from the terminal device, wherein power of the transmission is controlled based on the same TPC command comprised in one of the plurality of PDCCH candidates; and    to transmit, prior to the transmitting the plurality of PDCCH candidates, Radio Resource Control (RRC) signaling including information related to PDCCH repetition.

4. A terminal device, comprising:

at least one memory having program instructions stored therein; and at least one processor configured:

to receive, from a network device, a plurality of Physical Downlink Control Channel (PDCCH) candidates, the plurality of PDCCH candidates corresponding to downlink control information (DCI) for scheduling a transmission from the terminal device to the network device, wherein each of the plurality of PDCCH candidates comprises a same transmission power control (TPC) command for power control of the transmission;

to detect, from the plurality of PDCCH candidates, the DCI with the same TPC command;

to control, based on the TPC command, power of the transmission from the terminal device to the network device; and    to receive, prior to the receiving the plurality of PDCCH candidates, Radio Resource Control (RRC) signaling including information related to PDCCH repetition.

\* \* \* \* \*